United States Patent [19]

Chefalas et al.

[11] Patent Number: 5,544,260
[45] Date of Patent: Aug. 6, 1996

[54] SILENT TRAINING BY ERROR CORRECTION FOR ON-LINE HANDWRITING RECOGNITION SYSTEMS

[75] Inventors: Thomas E. Chefalas, Hawthorne; Charles C. Tappert, Ossining, both of N.Y.

[73] Assignee: International Business Machines Corporation, Armonk, N.Y.

[21] Appl. No.: 274,074

[22] Filed: Jul. 12, 1994

[51] Int. Cl.6 .............................. G06K 9/00; G06K 9/62
[52] U.S. Cl. ..................... 382/187; 382/189; 382/161
[58] Field of Search .................................. 382/13, 14, 15, 382/187, 189, 161

[56] References Cited

U.S. PATENT DOCUMENTS

| | | | |
|---|---|---|---|
| 4,451,929 | 5/1984 | Yoshida | 382/15 |
| 4,724,542 | 2/1988 | Willford | 382/15 |
| 4,972,496 | 11/1990 | Sklaren | 382/13 |
| 5,150,424 | 9/1992 | Aguro et al. | 382/13 |
| 5,150,425 | 9/1992 | Martin et al. | 382/15 |
| 5,257,074 | 10/1993 | Kamei | 382/13 |

OTHER PUBLICATIONS

"Handwritten Character Recognition with the ATHENA Model" IEEE Proc.–1990 Southeastcon Session 9B4 pp. 813–816 A. Abrahamsson et al.

"Symbol Recognition System by Elastic Matching" IBM Tech. Disc. Bulletin V. 24 #6 Nov. 1981 pp. 2897–2902 Kurtzberg et al.

"Using Neural Nets to Recognize Handwritten/Printed Characters" EEE Proc. Adv. Computer Tech. pp. 492–496 C. C. Chiang et al.

*Primary Examiner*—Leo Boudreau
*Assistant Examiner*—Chris Kelley
*Attorney, Agent, or Firm*—Robert P. Tassinari, Jr.

[57] ABSTRACT

A method for using information provided during error correction for modifying character prototypes in an on-line handwriting recognition system is disclosed. The method allows a user to correct misrecognized handwritten characters by overwriting directly on the displayed ASCII representation of the recognition result for a given character. The rewritten character is then used to silently retrain the system so as to adapt it to the user's particular handwriting style.

11 Claims, 6 Drawing Sheets

SILENT TRAINING BY ERROR CORRECTION FOR ON-LINE HANDWRITTING RECOGNITION SYSTEMS

FIELD OF THE INVENTION

This invention relates generally to handwriting recognition systems and, in particular, to a method and apparatus for training such systems to minimize the occurrence of repeat errors.

BACKGROUND OF THE INVENTION

Many on-line, handwriting recognition systems employ curve matching methods to match an unknown character against prototype, or template, characters. One example is T. Fujisaki, T. F. Chefalas, J. Kim and C. C. Tappert, "Online recognizer for runon handprinted characters," Proc. 10th Int. Conf. Pattern Recognition, pp. 450–454, June 1990. In general, the recognition accuracy of such prototype-based handwriting recognition systems is a function of the quality of the prototypes, which in turn, is dependent upon the efficiency and accuracy of system training.

Occasionally, errors are made by the recognition system and, when they occur, the user corrects them. However, in current systems there is no provision for training during error correction to prevent future similar errors. The training that is available requires the user to enter a special training mode. This mode switching interrupts the normal work flow of the user.

The following U.S. and Japanese Patents all teach various aspects of handwriting recognition systems.

U.S. Pat. No. 4,561,105, issued Dec. 24, 1985, entitled "Complex Pattern Recognition Method and System" to Crane et al describes an on-line character recognition system that uses template or model strokes (col 3, lines 1–52).

U.S. Pat. No, 5,285,505, issued Feb. 8, 1994, entitled "Method and Apparatus for Improving Prototypes of Similar Characters in On-Line Recognition" to Kim et al, describes a character recognition system for improving the prototypes of similar characters by emphasizing the dissimilarities of prototypes of similar characters and deemphasizing the similarities.

Japanese Patent No. 62-24382 entitled "Method for Recognizing Handwritten Character" describes, in the abstract, a method for recognizing handwritten characters in which input strokes are compared with reference strokes stored in a template memory.

C. Chiang and H. Fu, "Using Neural Nets to Recognize Handwritten/Printed Characters", IEEE Proc. Advanced Computer Technology, Reliable Systems and Applications, pp. 492–96, 1991, describes a handwritten character recognition system implemented by a stochastical neural network which can provide on-line training of a handwriting of the system.

What is not taught by the foregoing references, and what is thus an object of the invention to provide, is a method and apparatus for improving or optimizing a set of character prototypes, by training the system to recognize a particular user's style of writing.

A further object of the invention is to provide a method, and a system for accomplishing the method, for silently training (i.e., training performed without explicit knowledge of, or direction by, the user) the system to recognize a particular user's handwriting through user feedback, and without the user having to specifically request training.

Another object of the invention is to provide an efficient method of using the information provided during error correction to modify the prototypes so as to reduce the likelihood of similar errors occurring in the future. Such a method permits training to occur over time (that is, the prototype set to evolve) as a natural process without having the user switch modes.

The foregoing and other problems are overcome and the objects of the invention are realized by a method for silent training by error correction for an on-line handwriting recognition system.

SUMMARY OF THE INVENTION

The invention provides a method of training a handwriting recognition system to recognize handwritten characters of a particular user. The method includes storing a plurality of prototype characters in a memory, and entering a string of user-generated handwritten characters on an input device. The user generated string of characters is compared with the prototype characters stored in memory. Next, for each user generated handwritten character, a corresponding character is displayed, the corresponding character of a particular user-generated character being a prototype character most closely resembling the particular user-generated handwritten character. The user then enters on the input device, for each incorrectly recognized user-input character, a user-generated handwritten correction character. The user generated correction character is compared with the prototype characters stored in memory, excluding the incorrectly returned character. For each correction character, a corresponding correction character is displayed, the corresponding correction character of a particular user-generated correction character being a prototype character most closely resembling the user-generated handwritten correction character. The correction steps are then repeated if the system again returns an incorrect recognition result.

In one embodiment, the invention provides a method for using information provided during error correction for modifying character prototypes in an on-line handwriting recognition system. The method allows a user to correct misrecognized handwritten characters by overwriting directly on the displayed ASCII representation of the recognition result for a given character. The rewritten character is then used to silently retrain the system so as to adapt it to the user's particular handwriting style.

DETAILED DESCRIPTION OF THE INVENTION

Figure 1:
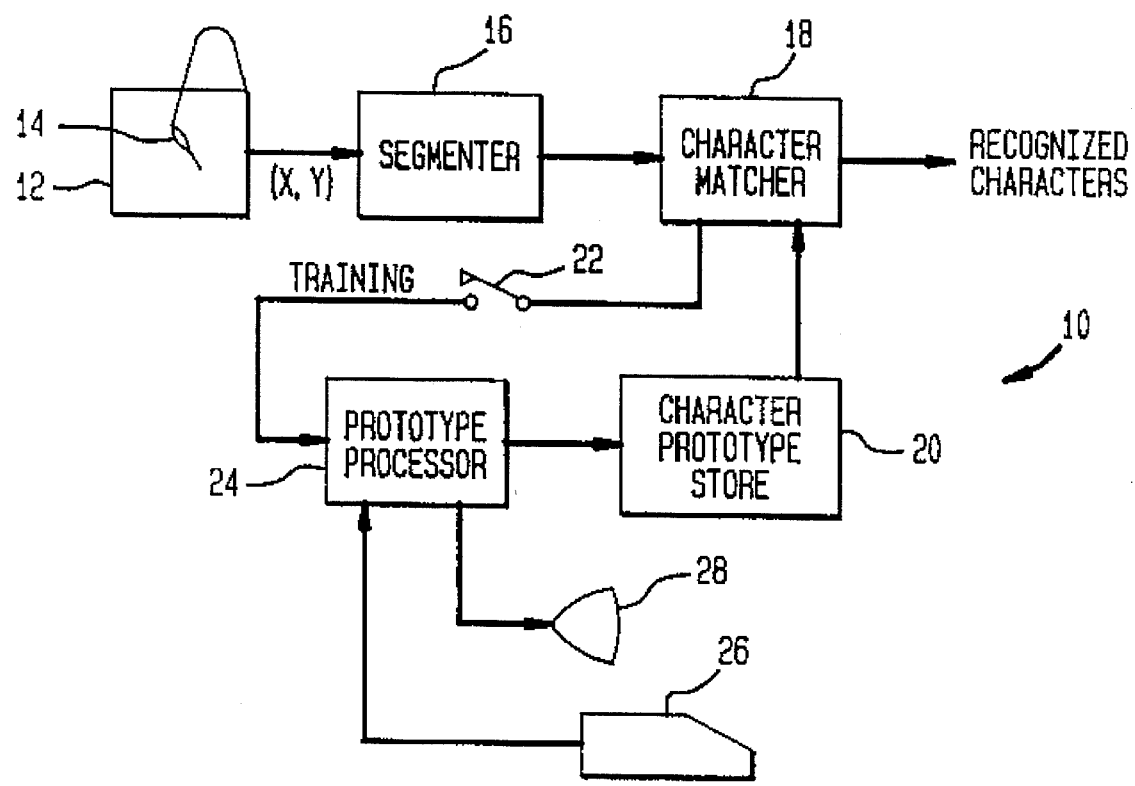
FIG. 1 is a simplified block diagram of a handwriting recognition system constructed and operated in accordance with the invention.

Referring to FIG. 1, there is shown an on-line handwriting character recognition system 10 constructed and operated in accordance with the invention. System 10 includes a handwriting transducer comprised of an electronic table 12 having a writing implement, such as a stylus 14. In response to handwritten characters, the transducer outputs a serial stream of (x,y) coordinate pairs corresponding to a position of the stylus 14 relative to a tablet 12 coordinate system. The coordinate pairs are provided to a stroke segmenter 16 that identifies a beginning and an end of discrete handwritten strokes. Strokes are provided to a character matcher 18. Character matcher 18 is coupled to a store 20 of predetermined character prototypes for comparing points of input strokes to points of stored character prototypes so as to identify, to within some probability, that an input stroke or assemblage of strokes represents a specific character. Recognized characters are output from the matcher 18 and may be displayed to a user or input to an application, such as a word processing program. In some systems, the functionality of the segmenter 16 and the character matcher 18 may be combined within one handwritten stroke processing unit.

Character prototypes may be provided to the store 20 during a training session held with a user of the system 10. The character prototypes may be entered by a specific user of the system and thereafter used only when the specific user enters handwritten characters. Also, a global or universal set of character prototypes may be generated for use with more than one user.

In this regard, a starter prototype set may be designed as an initial prototype set to be used by any writer on first using the system 10. If desired, a writer may then add character prototypes in his/her own writing style to obtain a prototype set tailored to the writer, also referred to as an individualized prototype set. In that a starter prototype set is typically created by an expert in handwriting recognition systems, there is no burden placed on a user of the system 10 to follow any writing suggestions or constraints.

In any case, during a training session, characters from character matcher 18 are routed through a physical or logical switch 22 to a prototype processor 24. Prototype processor 24 is also coupled to a user input and output device, such as a keyboard 26 and a display 28, for controlling the operation thereof, as will be described in detail below. The output of prototype processor 24 is a series of prototype characters that are supplied to store 20 for subsequent use during a handwriting recognition session conducted with a user of the system 10.

In accordance with the invention, there is provided a method of "silently" training the system during operation to more accurately recognize the handwriting of the particular writer. This training method is "silent" because it is performed without explicit knowledge of, or direction by the user. Through such silent training, the system adapts to the writing of the user and becomes more accurate with use over time.

In general, the method of the present invention operates to update the prototype set by using user-provided feedback to silently retrain the system. This is accomplished by disabling in the candidate store the individual character recognition result indicated to be erroneous by the user. The redrawn handwritten character is then used to select the closest match from among the remaining candidates. A preferred embodiment of the invention will now be described in detail.

Figure 2:
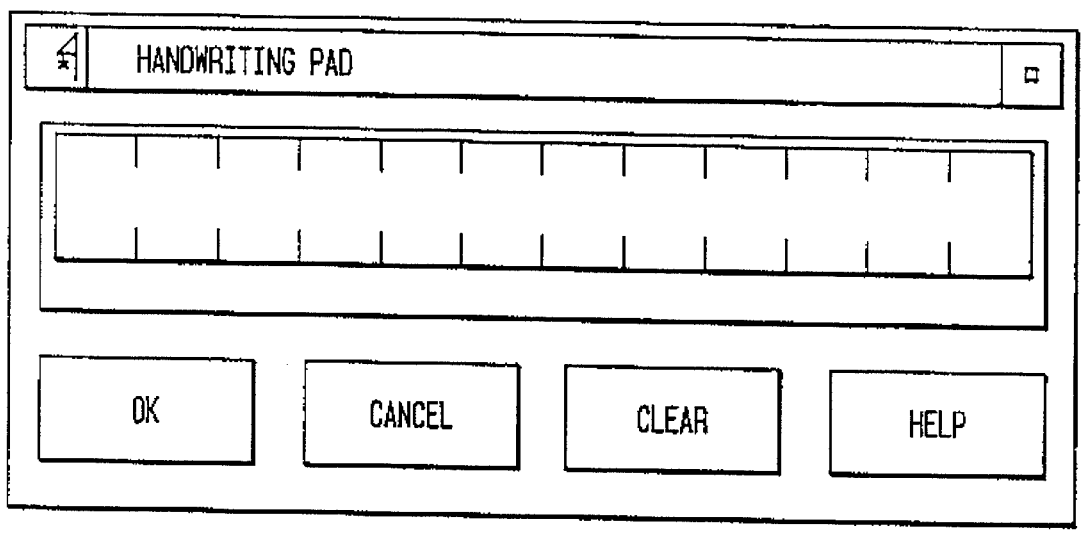
FIG. 2 is an empty handwriting pad upon which handwriting to be recognized is entered.
Figure 3:
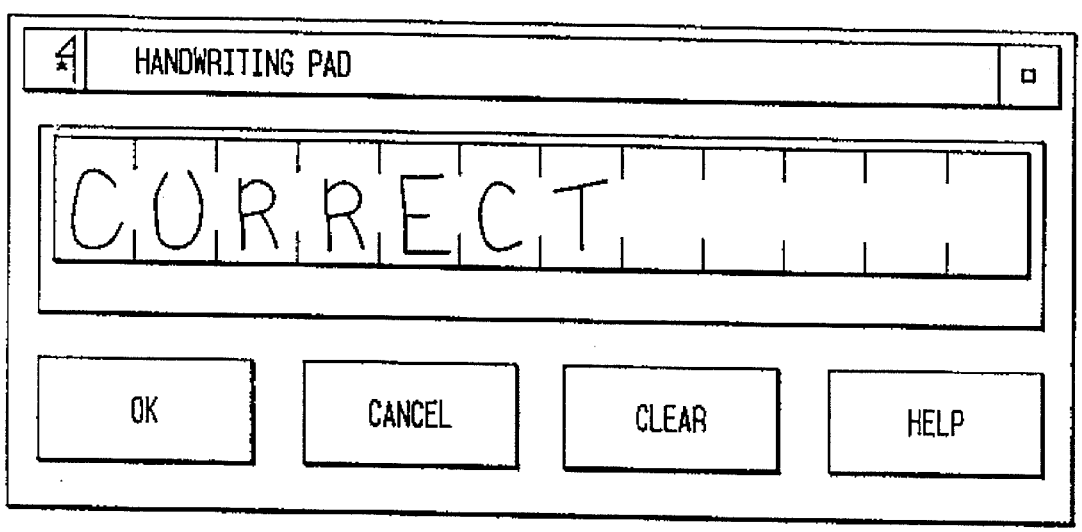
FIG. 3 shows a string of handwritten characters to be recognized written on the pad of FIG. 2.
Figure 4:
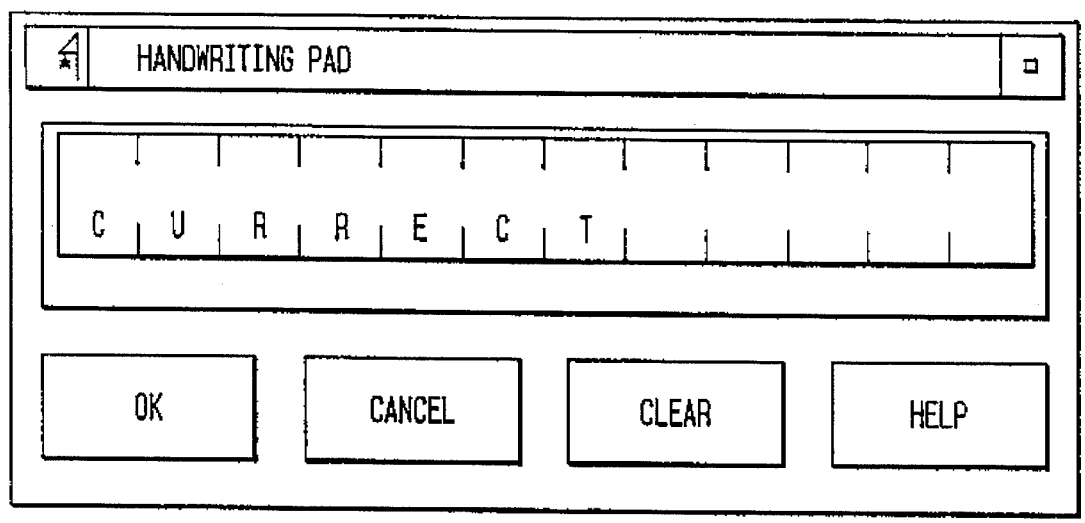
FIG. 4 is an example of a result of an erroneous recognition of the string of FIG. 3.
Figure 5:
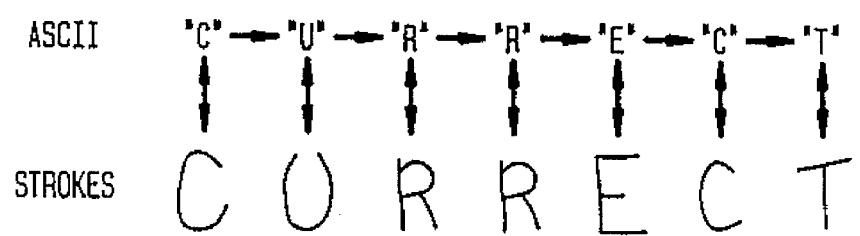
FIG. 5 illustrates the mapping of the originally input characters of FIG. 3 to the recognition result of FIG. 4.

The user starts with an empty handwriting pad, as shown in FIG. 2. The handwriting pad is displayed on the tablet 12 of FIG. 1. The user then writes strokes on the tablet-display, (FIG. 3). Each stroke is sent to segmenter 16 to begin processing. The user then taps the "OK button", and the system sends a completion notification to the segmenter to indicate that processing should begin. A completion notification can also be sent automatically via a time-out (user does not write for a period of time). The completion notification causes the recognition engine to return a translation result in the form of ASCII characters. The original ink corresponding to the handwriting is replaced by the recognized ASCII characters, as shown in FIG. 4. The original mapping of the input characters to the recognized characters is shown in FIG. 5.

Figure 6:
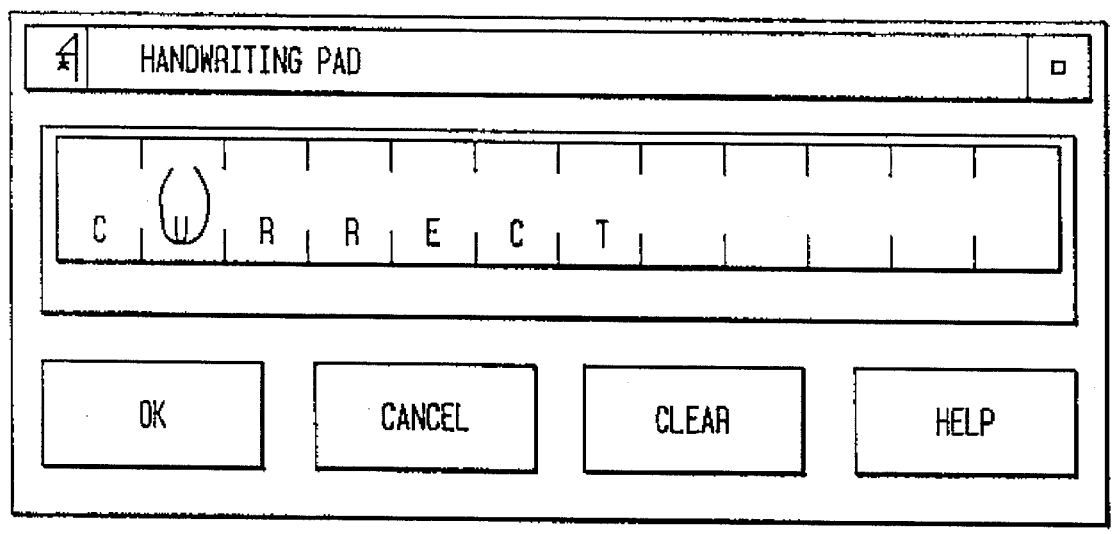
FIG. 6 shows a method for correcting recognition errors in accordance with the invention.
Figure 7:
FIG. 7 shows the mapping of the intended result to the originally entered character that was incorrectly recognized.
Figure 8:
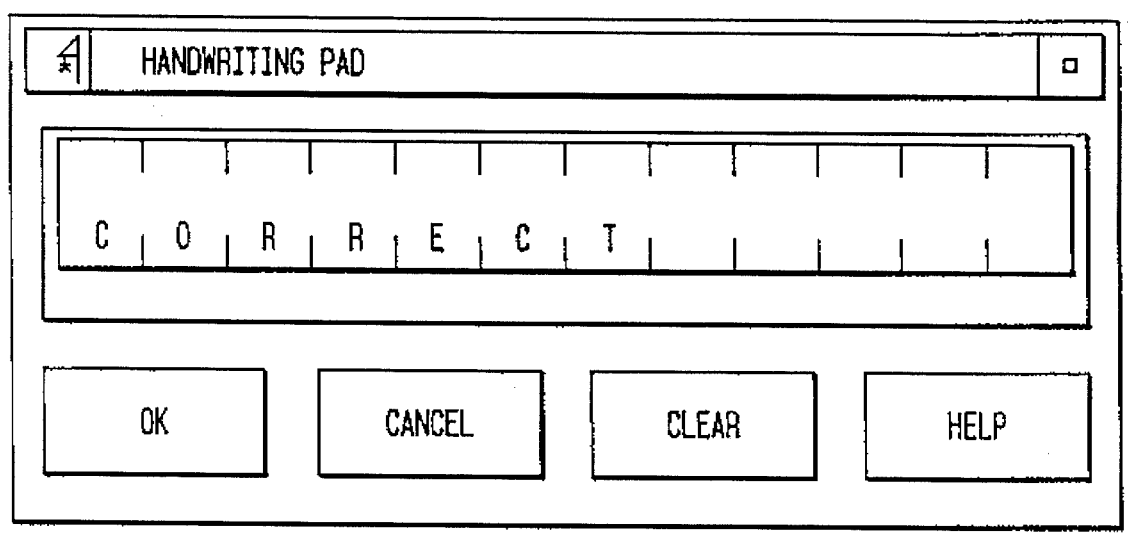
FIG. 8 shows the return of the correct recognition result after error correction.

When the user notices a recognition error, for instance an "0" incorrectly recognized as a "U", he over-writes the incorrect ASCII character with a handwritten correct one, i.e., another "0" in the present example, as shown in FIG. 6. The recognition system then tries to recognize the newly written character, and re-displays the resulting ASCII character, FIG. 8. During this recognition, the ASCII character previously indicated to be incorrect is eliminated from contention so that the same, erroneous character cannot be chosen. FIG. 7 shows a mapping of the handwritten character which was originally misrecognized to the intended result as obtained from the step depicted in FIG. 8. After all errors are corrected, the user finally accepts the results by touching "OK" or issuing an alternate "completion" command.

Figure 9:
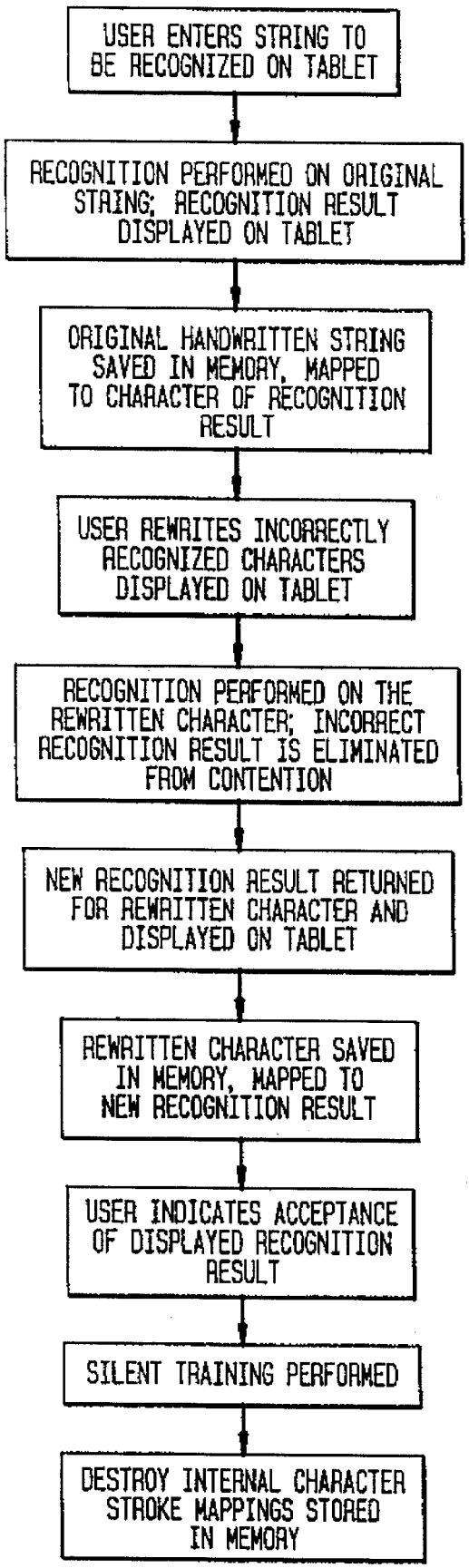
FIG. 9 is a flow chart depicting the method of the invention.

The method of silent training will now be described, with reference to the flow chart of FIG. 9. After the user initially enters a string of text (FIG. 3), and an initial recognition result is returned (FIG. 4), the recognition system internally saves the original handwritten strokes and the mapping to the translated ASCII characters (FIG. 5). When the user rewrites the misrecognized character directly on the displayed image of the incorrect ASCII character as shown in FIG. 6, the recognition system automatically eliminates the prior ASCII character from contention. This is achieved automatically by using the internally saved original strokes and mapping to the original translated ASCII characters. The recognition engine also internally saves the error correction strokes and the mapping to the translated ASCII characters, FIG. 7.

When the user finally accepts the translation, the recognition system is notified of final acceptance and performs a "silent training." The final error correction strokes and error correction mappings are assumed to be a legitimately written version of the recognized ASCII character. If the final error correction strokes are similar to the original strokes within a user settable threshold (similarity is determined by performing a match), both the error correction strokes and original strokes are used to silently train the recognition engine. This training is conducted in the same manner as original system training, with no intervention or direction required of the user. The strokes will be learned as the finally accepted ASCII results. The subsequently written characters alone can be used for training if not similar (within a matching threshold) to the accepted handwritten character.

After final acceptance and silent training, the recognition system destroys the internal strokes and mappings that were being saved.

While the system has been described with respect to a "boxed mode" handwriting pad for the original stroke input, it should be understood by those skilled in the art that other modes of original stroke input pads can be used, such as "Runon", "Cursive", "Symbols", etc., without departing from the spirit of the invention. The "boxed mode" is the preferred and simplest form because it automatically implies the mapping of strokes to translated ASCII results. For some of the other forms (e.g., cursive) of error correction, the mapping would need to be displayed back to the user for acceptance.

We claim:

1. A method of training a handwriting recognition system to recognize handwritten characters of a particular user, comprising:

(a) storing electrical representations of a plurality of prototype characters in a memory;

(b) entering a string of user-generated handwritten characters on an electronic digitizing tablet;

(c) generating an electrical representation of the string of handwritten characters;

(d) comparing the electrical representation of the user generated string of characters with the representations of the prototype characters stored in memory;

(e) displaying on the digitizing tablet, for each user generated handwritten character, a corresponding character, the corresponding character being a prototype character whose electrical representation most closely resembles the electrical representation of the particular user-generated handwritten character;

(f) entering on the digitizing tablet, for each incorrectly recognized user-input character, a user-generated handwritten correction character;

(g) comparing an electrical representation of the user generated handwritten correction character with the representations of the prototype characters stored in memory, excluding the electrical representation of the incorrectly returned character;

(h) displaying on the digitizing tablet, for each correction character, a corresponding correction character, the corresponding correction character of a particular user-generated handwritten correction character being a prototype character whose electrical representation most closely resembles the electrical representation of the particular user-generated handwritten correction character;

(i) repeating steps (f) through (h) if the corresponding correction character does not match the user generated correction character;

(j) comparing the electrical representation of the misrecognized user generated handwritten character and the user generated correction character and determining whether they resemble one another within a predetermined threshold and:

if so, retraining the system to recognize the misrecognized user generated character and the user generated correction character as the corresponding correction character;

if not, retraining the system to recognize the user generated correction character as the corresponding correction character.

2. The method of claim 1, wherein the retraining is done without request by the user.

3. The method of claim 1, wherein each of the user generated handwritten characters is mapped to its corresponding character, and wherein an electrical representation of the mapping is stored in system memory.

4. A system for recognizing handwritten characters, comprising:

an input device comprising means for transforming a user input string of characters into electrical representations thereof;

a character prototype store for storing electrical representations of prototype characters;

a character matcher comprising means for matching electrical representations of the user input character with the electrical representations of the prototype characters to recognize the user input characters;

means for displaying the results of the recognition of the user input characters on the input device;

means for user correction of an incorrect result of the recognition for each user input character, the means for correction comprising means for the user entering a corrected user input character on the input device, and means for comparing an electrical representation of the corrected user input character with electrical representations of the prototype characters, except for the incorrect prototype, and returning a corrected result character;

means for comparing the misrecognized user generated handwritten character and the corrected user input character and determining whether they resemble one another within a predetermined threshold, and:

if so, retraining the system to recognize the misrecognized user generated character and the corrected user input character as the corrected result character;

if not, retraining the system to recognize the corrected user input character as the corrected result character.

5. A method of training a handwriting recognition system to recognize handwritten characters of a particular user, comprising:

(a) storing plurality of prototype characters in a memory;

(b) entering a string of user-generated handwritten characters on an input device;

(c) comparing the user generated string of characters with the prototype characters stored in memory;

(d) displaying, for each user generated handwritten character, a corresponding character, the corresponding character of a particular user-generated character being a prototype character most closely resembling the particular user-generated handwritten character;

(e) entering a user-generated handwritten correction character for each incorrectly recognized user-input character;

(f) comparing the user generated correction characters with the prototype characters stored in memory, excluding the incorrectly returned character;

(g) displaying a corresponding correction character for each user generated correction character, the corresponding correction character of a particular user-generated correction character being a prototype character most closely resembling the particular user-generated handwritten correction character;

(h) repeating steps (e) through (g) if the corresponding correction character does not match the user generated correction character;

(i) comparing the misrecognized user generated handwritten character and the user generated correction character and determining whether they resemble one another within a predetermined threshold, and:

if so, retraining the system to recognize the misrecognized user generated character and the user generated correction character as the corresponding correction character;

if not, retraining the system to recognize the user generated correction character as the corresponding correction character.

6. The method of claim 5, further comprising:

retraining the system to recognize the user generated correction character as the corresponding correction character.

7. The method of claim 5, wherein each of the user generated handwritten characters is mapped to its corresponding character, and wherein the mapping is stored in system memory.

8. The method of claim 5, wherein each user generated correction character is mapped to its corresponding correction character, and wherein the mapping is stored in system memory.

9. The system of claim 4, wherein the input device comprises a digitizing tablet.

10. The method of claim 5, wherein the retraining is performed without request by the user.

11. The system of claim 4, further comprising means for writing the corrected character directly on the displayed representation of the result character.

* * * * *